US010844213B2

(12) United States Patent
Nomoto et al.

(10) Patent No.: US 10,844,213 B2
(45) Date of Patent: Nov. 24, 2020

(54) ACRYLIC THERMOPLASTIC RESIN COMPOSITION, MOLDED ARTICLE, FILM AND METHOD FOR PRODUCING SAME, AND LAMINATE

(71) Applicant: KURARAY CO., LTD., Kurashiki (JP)

(72) Inventors: Yusaku Nomoto, Tsukuba (JP); Daisuke Ohta, Tainai (JP)

(73) Assignee: KURARAY CO., LTD., Kurashiki (JP)

( * ) Notice: Subject to any disclaimer, the term of this patent is extended or adjusted under 35 U.S.C. 154(b) by 83 days.

(21) Appl. No.: 16/096,593

(22) PCT Filed: Apr. 26, 2017

(86) PCT No.: PCT/JP2017/016456
§ 371 (c)(1),
(2) Date: Oct. 25, 2018

(87) PCT Pub. No.: WO2017/188290
PCT Pub. Date: Nov. 2, 2017

(65) Prior Publication Data
US 2019/0136035 A1    May 9, 2019

(30) Foreign Application Priority Data
Apr. 27, 2016    (JP) ................................. 2016-088910

(51) Int. Cl.
*C08J 5/18* (2006.01)
*C08L 33/12* (2006.01)
*C08L 51/04* (2006.01)
*C08L 53/00* (2006.01)
*B32B 27/30* (2006.01)
*B29C 48/305* (2019.01)
*B29C 48/08* (2019.01)
*C08F 12/08* (2006.01)
*C08F 220/18* (2006.01)
*C08F 299/04* (2006.01)
*B29C 48/04* (2019.01)
*B29C 48/05* (2019.01)
*B29C 48/09* (2019.01)
*B29C 48/10* (2019.01)

(52) U.S. Cl.
CPC .............. *C08L 33/12* (2013.01); *B29C 48/08* (2019.02); *B29C 48/305* (2019.02); *B32B 27/30* (2013.01); *C08F 12/08* (2013.01); *C08F 220/18* (2013.01); *C08F 299/0492* (2013.01); *C08J 5/18* (2013.01); *C08L 51/04* (2013.01); *C08L 53/00* (2013.01); *B29C 48/04* (2019.02); *B29C 48/09* (2019.02); *B29C 48/05* (2019.02); *B29C 48/09* (2019.02); *B29C 48/10* (2019.02); *C08F 2800/20* (2013.01); *C08L 2207/53* (2013.01)

(58) Field of Classification Search
CPC .......... C08L 33/12; C08L 51/04; C08L 53/00; C08L 2207/53; B29C 48/305; B29C 48/30; B29C 27/30; C08F 12/08; C08F 220/18; C08F 299/0492; C08F 2800/20; C08J 5/18
USPC ....................................................... 523/201
See application file for complete search history.

(56) References Cited

U.S. PATENT DOCUMENTS

| 6,348,542 B1 * | 2/2002 | Naruse ................... C08F 285/00 524/504 |
| 8,697,811 B2 * | 4/2014 | Kishi ...................... C08L 63/00 525/308 |
| 2003/0236318 A1 * | 12/2003 | Kitano ........................ C09J 4/06 522/109 |
| 2005/0234199 A1 * | 10/2005 | Taniguchi ........... C08F 293/005 525/242 |
| 2009/0246482 A1 * | 10/2009 | Sugimura ............... B32B 27/08 428/195.1 |
| 2019/0168493 A1 * | 6/2019 | Takeda ................ C08F 297/026 |

FOREIGN PATENT DOCUMENTS

| CN | 1300789 A | 6/2001 |
| JP | 10-338792 A | 12/1998 |
| JP | 2001-181357 A | 7/2001 |
| JP | 2002-60584 A | 2/2002 |
| JP | 2002-194167 A | 7/2002 |
| JP | 2005-8861 A | 1/2005 |
| JP | 2010-254849 A | 11/2010 |
| JP | WO 2016/080124 A1 | 5/2016 |

OTHER PUBLICATIONS

Extended European Search Report dated Nov. 28, 2019 in corresponding European Patent Application No. 17789572.9 citing documents therein, 6 pages.
International Search Report dated Jul. 11, 2017 in PCT/JP2017/016456 filed Apr. 26, 2017.
Combined Chinese Office Action and Search Report dated Jun. 1, 2020 in Chinese Patent Application No. 201780025513.X (with English translation), citing document AO therein, 20 pages.

* cited by examiner

Primary Examiner — Hannah J Pak
(74) Attorney, Agent, or Firm — Oblon, McClelland, Maier & Neustadt, L.L.P.

(57) ABSTRACT

Disclosed is an acrylic thermoplastic resin composition containing an acrylic multilayer structure polymer particle (A) and an acrylic block copolymer (B). The component (A) has, as an inner layer, a rubber component layer (I) of a copolymer of 50-99.99 mass % of an acrylic acid ester monomer unit, 49.99-0 mass % of an additional monofunctional monomer unit, and 0.01-10 mass % of a polyfunctional monomer unit, and has, as an outermost layer, a thermoplastic resin component layer (II) of a copolymer of 40-100 mass % of a methacrylic acid ester monomer unit and 60-0 mass % of an additional monomer unit and having Mn of 30,000 or smaller. A layer (I)/layer (II) mass ratio is 30/70 to 90/10. An average particle size of the component (A) is 150 nm or smaller. The component (B) has Mw of 32,000 to 300,000. A mass ratio of (A)/(B) is 1/99 to 99/1.

11 Claims, No Drawings

ACRYLIC THERMOPLASTIC RESIN COMPOSITION, MOLDED ARTICLE, FILM AND METHOD FOR PRODUCING SAME, AND LAMINATE

TECHNICAL FIELD

The present disclosure relates to an acrylic thermoplastic resin composition, a molded article, a film and a method for producing the same, and a laminate.

BACKGROUND ART

Multilayer structure polymer particles having a rubber component layer as an inner layer and having a thermoplastic resin component layer as an outermost layer (so-called core-shell-type polymer particles) are suitably used in the imparting of toughness modification, etc. of thermoplastic resins such as acrylic resin, polyvinyl chloride, and polyester.

In general, in the case of moulding multilayer structure polymer particles alone, the amount of the thermoplastic resin component in the outermost layer is set to a relatively low value, whereby there is a tendency to improve flexibility and exert an effect of imparting favorable toughness but deteriorate moldability. If the amount of the thermoplastic resin component in the outermost layer is increased, there is a tendency to improve moldability but reduce flexibility and reduce the effect of imparting toughness. In the multilayer structure polymer particles, favorable transparency is obtained by matching up the respective refractive indexes of the layers. If the glass transition temperature (Tg) of the rubber component layer is decreased in order to make a recovery from reduced flexibility, it is difficult to match up the respective refractive indexes of the layers and thus difficult to secure transparency.

Patent Literature 1 discloses a three-layer or more multilayer structure polymer particle having a preferred number-average molecular weight (Mn) of a thermoplastic resin component in an outermost layer, preferred average particle size, and preferred solubility of a starting monomer in a rubber component layer in water, etc. (Claim 1) for the purpose of achieving both characteristics (e.g. transparency and flexibility) and moldability. This multilayer structure polymer particle does not have necessarily sufficient moldability of film formation, etc. by a T-die method, though being excellent in characteristics such as transparency and flexibility.

Patent Literature 2 discloses a methacrylic resin composition comprising a multilayer structure polymer particle supplemented with two methacrylic polymers differing in weight-average molecular weight (Mw) (Claim 1) for the purpose of improving moldability. Also, Patent Literature 3 discloses a thermoplastic resin composition comprising a multilayer structure polymer particle supplemented with a block copolymer comprising a methacrylic polymer block and an acrylic polymer block, the multilayer structure polymer particle consisting of a copolymer of acrylic acid ester and methacrylic acid ester (Claim 3). The resin compositions described in these literatures do not have necessarily sufficient flexibility, though being improved in terms of moldability. In addition, it is necessary to increase a molding temperature for melting and plasticizing a resin having a high melting temperature. This might aggregate multilayer structure polymer particles and thereby deteriorate the surface shapes of molded articles such as films.

CITATION LIST

Patent Literature

Patent Literature 1: Japanese Unexamined Patent Application Publication No. 2001-181357
Patent Literature 2: Japanese Unexamined Patent Application Publication No. H10-338792
Patent Literature 3: Japanese Unexamined Patent Application Publication No. 2002-194167

SUMMARY OF INVENTION

Technical Problem

The present disclosure has been made in light of the situation described above. An object of the present disclosure is to provide a multilayer structure polymer particle-containing thermoplastic resin composition excellent in transparency, flexibility, and moldability.

Solution to Problem

The present disclosure provides an acrylic thermoplastic resin composition, a molded article, a film and a method for producing the same, and a laminate given below.

[1] An acrylic thermoplastic resin composition comprising a two-layer or more multilayer structure polymer particle (A) and a block copolymer (B), wherein:
  the multilayer structure polymer particle (A) is an acrylic multilayer structure polymer particle which has, as an inner layer, at least one rubber component layer (I) consisting of a copolymer consisting of 50 to 99.99% by mass of an acrylic acid ester monomer unit, 49.99 to 0% by mass of an additional monofunctional monomer unit, and 0.01 to 10% by mass of a polyfunctional monomer unit, and has, as an outermost layer, at least one thermoplastic resin component layer (II) consisting of a copolymer consisting of 40 to 100% by mass of a methacrylic acid ester monomer unit and 60 to 0% by mass of an additional monomer unit and having a number-average molecular weight of 30,000 or smaller measured by GPC, wherein
  a mass ratio of the total amount of the rubber component layer (1) to the total amount of the thermoplastic resin component layer (II) (layer (I)/layer (II)) is 30/70 to 90/10, and an average particle size is 150 nm or smaller;
  the block copolymer (B) is an acrylic block copolymer having a weight-average molecular weight of 32,000 to 300,000 measured by GPC; and
  a mass ratio of the multilayer structure polymer particle (A) to the block copolymer (B) ((A)/(B)) is 1/99 to 99/1.

[2] The acrylic thermoplastic resin composition according to [1], wherein:
  the multilayer structure polymer particle (A) is a multilayer structure polymer particle having a three-layer structure consisting of a rubber component layer (Ia) which is a first rubber component layer (I), a rubber component layer (Ib) which is a second rubber component layer (I), and the thermoplastic resin component layer (II) in the presented order from nearer the center, wherein a mass ratio of the rubber component layer (Ia) to the rubber component layer (Ib) ((Ia)/(Ib)) is 5/95 to 95/5; and a value determined by subtracting a percent content (% by mass) of the acrylic acid ester monomer unit in the rubber component layer (Ib) from a percent content (% by mass) of the acrylic acid ester monomer unit in the rubber component layer (Ia) is 3% by mass or more.

[3] The acrylic thermoplastic resin composition according to [1] or [2], wherein the rubber component layer (I) comprises a styrene monomer unit as the additional monofunctional monomer unit.

[4] The acrylic thermoplastic resin composition according to any of [1] to [3], wherein the block copolymer (B) comprises 10 to 80% by mass of a polymer block (b1) having 80% by mass or more of a methacrylic acid ester monomer unit, and 90 to 20% by mass of a polymer block (b2) having 45% by mass or more of an acrylic acid ester monomer unit (wherein the total amount of the polymer block (b1) and the polymer block (b2) is defined as 100% by mass).

[5] The acrylic thermoplastic resin composition according to any of [1] to [4], wherein the block copolymer (B) is a triblock copolymer.

[6] The acrylic thermoplastic resin composition according to any of [1] to [5], wherein the mass ratio of the multilayer structure polymer particle (A) to the block copolymer (B) ((A)/(B)) is 51/49 to 99/1.

[7] The acrylic thermoplastic resin composition according to any of [1] to [6], further comprising a methacrylic resin (C), wherein a content of the methacrylic resin (C) is 1 to 20 parts by mass with respect to 100 parts by mass in total of the multilayer structure polymer particle (A) and the methacrylic resin (C).

[8] A molded article consisting of an acrylic thermoplastic resin composition according to any of [1] to [7].

[9] A film consisting of an acrylic thermoplastic resin composition according to any of [1] to [7].

[10] A method for producing a film according to [9], comprising forming the film by a T-die method.

[11] A laminate having an acrylic thermoplastic resin layer consisting of an acrylic thermoplastic resin composition according to any of [1] to [7], and an additional resin layer.

[12] The laminate according to [11], wherein the additional resin layer comprises at least one thermoplastic resin selected from the group consisting of methacrylic resin, polyvinyl chloride, ABS (acrylonitrile-butadiene-styrene copolymer) resin, and polycarbonate.

Advantageous Effects of Invention

The present disclosure can provide a multilayer structure polymer particle-containing thermoplastic resin composition excellent in transparency, flexibility, and moldability.

DESCRIPTION OF EMBODIMENTS

"Acrylic Thermoplastic Resin Composition"

The acrylic thermoplastic resin composition (hereinafter, also simply referred to as a "thermoplastic resin composition") of the present disclosure comprises a specific acrylic multilayer structure polymer particle (A) having two or more layers and a specific acrylic block copolymer (B).

The multilayer structure polymer particle (A) has, as an inner layer, at least one rubber component layer (I) consisting of a copolymer consisting of 50 to 99.99% by mass of an acrylic acid ester monomer unit, 49.99 to 0% by mass of an additional monofunctional monomer unit, and 0.01 to 10% by mass of a polyfunctional monomer unit, and has, as an outermost layer, at least one thermoplastic resin component layer (II) consisting of a copolymer consisting of 40 to 100% by mass of a methacrylic acid ester monomer unit and 60 to 0% by mass of an additional monomer unit and having a number-average molecular weight (Mn) of 30,000 or smaller measured by GPC. In the multilayer structure polymer particle (A), a mass ratio of the total amount of the rubber component layer (I) to the total amount of the thermoplastic resin component layer (II) (layer (I)/layer (II)) is 30/70 to 90/10. An average particle size is 150 nm or smaller.

The block copolymer (B) has a weight-average molecular weight (Mw) of 32,000 to 300,000 measured by GPC.

A mass ratio of the multilayer structure polymer particle (A) to the block copolymer (B) ((A)/(B)) is 1/99 to 99/1.

As mentioned in the section [Background Art], in the case of moulding multilayer structure polymer particles alone, the amount of the thermoplastic resin component in the outermost layer is generally set to a relatively low value, whereby there is a tendency to improve flexibility and exert an effect of imparting favorable toughness but deteriorate moldability. If the amount of the thermoplastic resin component in the outermost layer is increased, there is a tendency to improve moldability but reduce flexibility and reduce the effect of imparting toughness. In the multilayer structure polymer particles, favorable transparency is obtained by matching up the respective refractive indexes of the layers. If the glass transition temperature (Tg) of the rubber component layer is decreased in order to make a recovery from reduced flexibility, it is difficult to match up the respective refractive indexes of the layers and thus difficult to secure transparency.

In the present disclosure, combined use of the specific multilayer structure polymer particle (A) and the specific block copolymer (B) can achieve both flexibility and moldability without decreasing Tg of the rubber component layer of the multilayer structure polymer particle. Furthermore, such absence of decrease in Tg of the rubber component layer of the multilayer structure polymer particle facilitates matching up the respective refractive indexes of the layers of the multilayer structure polymer particle and can also secure favorable transparency.

(Multilayer Structure Polymer Particle (A))

The multilayer structure polymer particle (A) has at least one rubber component layer (I) (hereinafter, also simply referred to as a "layer (I)") as an inner layer and has at least one thermoplastic resin component layer (II) (hereinafter, also simply referred to as a "layer (II)") as an outermost layer. The number of layers of the multilayer structure polymer particle (A) can be two or more layers and may be three layers or four or more layers. Examples of the layer structure include: a two-layer structure of layer (I)-layer (II); a three-layer structure of layer (I)-layer (I)-layer (II), layer (I)-layer (II)-layer (II), or layer (II)-layer (I)-layer (II); and a four-layer structure of layer (I)-layer (II)-layer (I)-layer (II) or the like, in the presented order from nearer the center. Among them, a two-layer structure of layer (I)-layer (II); or a three-layer structure of layer (I)-layer (I)-layer (II) or layer (II)-layer (I)-layer (II) is preferred from the viewpoint of handleability.

The mass ratio of the total amount of the rubber component layer (I) to the total amount of the thermoplastic resin component layer (II) (layer (I)/layer (II)) is 30/70 to 90/10.

If the proportion of the layer (I) is less than the range described above, a molded article (including a film) of the thermoplastic resin composition of the present disclosure might have insufficient elastic recovery. If the proportion of the layer (I) exceeds the range described above, it is difficult to form a particle structure and it might be difficult to knead the resulting component with other components due to reduced melt fluidity and mold the thermoplastic resin composition of the present disclosure. The mass ratio (layer (I)/layer (II)) is preferably 50/50 to 90/10, more preferably 60/40 to 80/20.

The layer (I) consists of a copolymer consisting of 50 to 99.99% by mass of an acrylic acid ester monomer unit serving as an essential component, 49.99 to 0% by mass of an additional monofunctional monomer unit serving as an optional component, and 0.01 to 10% by mass of a polyfunctional monomer unit serving as an essential component. The content of the acrylic acid ester monomer unit is preferably 55 to 99.9% by mass, the content of the monofunctional monomer unit is preferably 44.9 to 0% by mass, and the content of the polyfunctional monomer unit is preferably 0.1 to 2% by mass.

If the content of the acrylic acid ester monomer is less than 50% by mass, a molded article (including a film) of the thermoplastic resin composition of the present disclosure might have insufficient elastic recovery due to insufficient rubber elasticity of the multilayer structure polymer particle (A). If the content exceeds 99.99% by mass, it might be difficult to form a particle structure. If the content of the polyfunctional monomer unit exceeds 10% by mass, a molded article (including a film) of the thermoplastic resin composition of the present disclosure might have insufficient elastic recovery due to insufficient rubber elasticity of the multilayer structure polymer particle (A). If the content is less than 0.01% by mass, it might be difficult to form a particle structure. If the content of the additional monofunctional monomer exceeds 49.99% by mass, the multilayer structure polymer particle (A) might have insufficient weather resistance.

Hereinafter, the starting monomers of the layer (I) will be described.

Examples of the acrylic acid ester include: esters of acrylic acid and saturated aliphatic alcohols (preferably C1 to C18 saturated aliphatic alcohols), such as methyl acrylate (MA), ethyl acrylate, n-propyl acrylate, isopropyl acrylate, n-butyl acrylate (BA), isobutyl acrylate, s-butyl acrylate, t-butyl acrylate, pentyl acrylate, hexyl acrylate, octyl acrylate, 2-ethylhexyl acrylate, dodecyl acrylate, and octadecyl acrylate; esters of acrylic acid and C5 or C6 alicyclic alcohols, such as cyclohexyl acrylate; esters of acrylic acid and phenols, such as phenyl acrylate; and esters of acrylic acid and aromatic alcohols, such as benzyl acrylate. One or two or more of these acrylic acid esters can be used.

The polyfunctional monomer is a monomer having two or more carbon-carbon double bonds in the molecule. Examples of the polyfunctional monomer include: esters of unsaturated monocarboxylic acids such as acrylic acid, methacrylic acid, and cinnamic acid, and unsaturated alcohols such as allyl alcohol and methallyl alcohol; diesters of the unsaturated monocarboxylic acids described above and glycols such as ethylene glycol, butanediol, and hexanediol; and esters of dicarboxylic acids such as phthalic acid, terephthalic acid, isophthalic acid, and maleic acid, and the unsaturated alcohols described above. Specific examples thereof include allyl acrylate, methallyl acrylate, allyl methacrylate (ALMA), methallyl methacrylate, allyl cinnamate, methallyl cinnamate, diallyl maleate, diallyl phthalate, diallyl terephthalate, diallyl isophthalate, divinylbenzene, ethylene glycol di(meth)acrylate, butanediol di(meth)acrylate, and hexanediol di(meth)acrylate. Other examples thereof include conjugated diene monomers such as butadiene, isoprene, 2,3-dimethylbutadiene, 2-methyl-3-ethylbutadiene, 1,3-pentadiene, 3-methyl-1,3-pentadiene, 2-ethyl-1,3-pentadiene, 1,3-hexadiene, 2-methyl-1,3-hexadiene, 3,4-dimethyl-1,3-hexadiene, 1,3-heptadiene, 3-methyl-1,3-heptadiene, 1,3-octadiene, cyclopentadiene, chloroprene, and myrcene. Among them, allyl methacrylate (ALMA) is preferred. One or two or more of these polyfunctional monomers can be used.

Examples of the additional monofunctional monomer serving as an optional component include methacrylic acid esters including: esters of methacrylic acid and saturated aliphatic alcohols (preferably C1 to C22 saturated aliphatic alcohols), such as methyl methacrylate (MMA), ethyl methacrylate, n-propyl methacrylate, isopropyl methacrylate, n-butyl methacrylate, isobutyl methacrylate, pentyl methacrylate, hexyl methacrylate, octyl methacrylate, 2-ethylhexyl methacrylate, dodecyl methacrylate, myristyl methacrylate, palmityl methacrylate, stearyl methacrylate, and behenyl methacrylate; esters of methacrylic acid and C5 or C6 alicyclic alcohols, such as cyclohexyl methacrylate; esters of methacrylic acid and phenols, such as phenyl methacrylate; and esters of methacrylic acid and aromatic alcohols, such as benzyl methacrylate.

Other examples of the additional monofunctional monomer include: aromatic vinyl monomers such as styrene (St), α-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and halogenated styrene; and vinyl cyanide monomers such as acrylonitrile and methacrylonitrile. One or two or more of these additional monofunctional monomers can be used.

The layer (II) consists of a copolymer consisting of 40 to 100% by mass of a methacrylic acid ester monomer unit serving as an essential component and 60 to 0% by mass of an additional monomer unit serving as an optional component. The content of the methacrylic acid ester monomer unit is preferably 60 to 99% by mass, more preferably 80 to 99% by mass, and the content of the additional monomer unit is preferably 40 to 1% by mass, more preferably 20 to 1% by mass. If the content of the methacrylic acid ester monomer unit is less than 40% by mass, the multilayer structure polymer particle (A) might have insufficient weather resistance.

Hereinafter, the starting monomers of the layer (II) will be described.

Examples of the methacrylic acid ester include methyl methacrylate (MMA), ethyl methacrylate, n-propyl methacrylate, isopropyl methacrylate, n-butyl methacrylate, isobutyl methacrylate, pentyl methacrylate, hexyl methacrylate, octyl methacrylate, 2-ethylhexyl methacrylate, cyclohexyl methacrylate, dodecyl methacrylate, myristyl methacrylate, palmityl methacrylate, stearyl methacrylate, behenyl methacrylate, octadecyl methacrylate, phenyl methacrylate, and benzyl methacrylate. Among them, methyl methacrylate (MMA) is preferred.

Examples of the additional monomer include: esters of acrylic acid and saturated aliphatic alcohols (preferably C1 to C18 saturated aliphatic alcohols), such as methyl acrylate (MA), ethyl acrylate, n-propyl acrylate, isopropyl acrylate, n-butyl acrylate (BA), isobutyl acrylate, s-butyl acrylate, t-butyl acrylate, pentyl acrylate, hexyl acrylate, octyl acrylate, 2-ethylhexyl acrylate, dodecyl acrylate, and octadecyl acrylate; esters of acrylic acid and C5 or C6 alicyclic alcohols, such as cyclohexyl acrylate; aromatic vinyl monomers such as styrene (St), α-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and halogenated styrene; vinyl cyanide monomers such as acrylonitrile and methacrylonitrile; maleimide monomers such as maleimide, N-methylmaleimide, N-ethylmaleimide, N-propylmaleimide, N-isopropylmaleimide, N-cyclohexylmaleimide, N-phenylmaleimide, N-(p-bromophenyl)maleimide, and N-(chlorophenyl)maleimide; and the polyfunctional monomers listed in the layer (I). Among them, acrylic acid alkyl esters such as methyl acrylate (MA), ethyl acrylate, and n-butyl acrylate (BA) are preferred.

In the multilayer structure polymer particle (A), the constituent copolymer of the layer (II) constituting at least the outermost layer has a number-average molecular weight (Mn) of 30,000 or smaller measured by GPC. If this Mn exceeds 30,000, a molded article (including a film) of the thermoplastic resin composition of the present disclosure might have insufficient elastic recovery due to insufficient rubber elasticity of the multilayer structure polymer particle (A). Furthermore, it might be difficult to knead the resulting component with other components due to reduced melt fluidity and mold the thermoplastic resin composition of the present disclosure. Mn is preferably 1,000 or larger, more preferably 3,000 to 20,000, from the viewpoint of the elastic recovery of a molded article and process passableness in the production of the multilayer structure polymer particle (A).

In the present specification, GPC is an abbreviation of "gel permeation chromatography". In the present specification, "weight-average molecular weight (Mw) and number-average molecular weight (Mn)" are values measured by GPC and determined by converting the chromatogram measured by GPC to the molecular weight of standard polystyrene, unless otherwise specified. Mn of the copolymer constituting the outermost layer of the multilayer structure polymer particle (A) can be determined by subjecting the multilayer structure polymer particle (A) to solvent extraction with an organic solvent such as acetone and measuring the resulting sample by GPC.

The average particle size of the multilayer structure polymer particle (A) is 150 nm or smaller. If the average particle size exceeds 150 nm, a molded article (including a film) of the thermoplastic resin composition of the present disclosure might have insufficient elastic recovery due to insufficient rubber elasticity of the multilayer structure polymer particle (A). Furthermore, it might be difficult to knead the resulting component with other components due to reduced melt fluidity and mold the thermoplastic resin composition of the present disclosure. The average particle size is preferably 30 nm or larger, more preferably 80 to 120 nm, from the viewpoint of easily forming the particle structure of the multilayer structure polymer particle (A).

Examples of the method for measuring the "average particle size of the multilayer structure polymer particle (A)" include a method of measuring, by dynamic light scattering, a sample collected from latex of the multilayer structure polymer particle (A), as described in the section [Examples] mentioned later, and a method of dissolving an organic solvent-soluble moiety of the thermoplastic resin composition using an organic solvent such as acetone, isolating the moiety by centrifugation, followed by measurement by electron microscope observation or dynamic light scattering in a solvent.

The multilayer structure polymer particle (A) is preferably a multilayer structure polymer particle (AX) having a three-layer structure consisting of a rubber component layer (Ia) which is a first rubber component layer (I), a rubber component layer (Ib) which is a second rubber component layer (I), and the thermoplastic resin component layer (II) in the presented order from nearer the center from the viewpoint of physical properties and easy production, etc.

The mass ratio of the rubber component layer (Ia) to the rubber component layer (Ib) ((Ia)/(Ib)) is preferably 5/95 to 95/5, more preferably 20/80 to 80/20, from the viewpoint of achieving both flexibility and other mechanical properties of a molded article (including a film) of the thermoplastic resin composition of the present disclosure.

The percent content of the acrylic acid ester monomer unit ($C_{AE}$(Ia) (% by mass)) in the rubber component layer (Ia) is preferably higher than the percent content of the acrylic acid ester monomer unit ($C_{AE}$(Ib) (% by mass)) in the rubber component layer (Ib) ($C_{AE}$(Ia)>$C_{AE}$(Ib)), from the viewpoint of achieving both flexibility and other mechanical properties of a molded article (including a film) of the thermoplastic resin composition of the present disclosure. A value determined by subtracting $C_{AE}$(Ib) (% by mass) from $C_{AE}$(Ia) (% by mass) is more preferably 3% by mass or more ($3 \leq [C_{AE}$(Ia)$-C_{AE}$(Ib)]), particularly preferably 4 to 30% by mass ($4 \leq [C_{AE}$(Ia)$-C_{AE}$(Ib)] $\leq 30$).

The multilayer structure polymer particle (A) can be produced by performing a polymerization reaction step (S1) of forming the rubber component layer (I) and a polymerization reaction step (S2) of forming the thermoplastic resin component layer (II) in order of lamination.

In the polymerization reaction step (S1), a monomer mixture (i) corresponding to the copolymer composition of the rubber component layer (I) is copolymerized by a method known in the art. Likewise, in the polymerization reaction step (S2), a monomer mixture (ii) corresponding to the copolymer composition of the thermoplastic resin component layer (II) is copolymerized by a method known in the art. In the polymerization reaction step (S2), the polymerization conditions are adjusted such that Mn of the constituent copolymer of the layer (II) constituting at least the outermost layer is 30,000 or smaller. Also, the polymerization conditions of all the polymerization reaction steps are adjusted such that the mass ratio of the total amount of the monomer mixture (i) to the total amount of the monomer mixture (ii) ((i)/(ii)) for use in all the polymerization reaction step falls within the range of 30/70 to 90/10, and the average particle size of the multilayer structure polymer particle (A) to be finally obtained is 150 nm or smaller.

In the polymerization reaction step (S2) of forming the thermoplastic resin component layer (II) at least as the outermost layer, it is preferred to use a molecular weight adjuster at a proportion of 0.4 to 10%0/by mass with respect to the monomer mixture (ii). The amount of the molecular weight adjuster used is more preferably 0.4 to 5% by mass, particularly preferably 0.6 to 2% by mass, with respect to the monomer mixture (ii).

In general, in the production of multilayer structure polymer particles, the amount of the molecular weight adjuster used in a polymerization reaction step of forming a thermoplastic resin component layer as an outermost layer is on the order of 0 to 0.3% by mass with respect to monomers (mixture). However, the present inventors have found that if the amount of the molecular weight adjuster used is less than 0.4% by mass, a molded article (including a film) of the thermoplastic resin composition of the present disclosure might have insufficient flexibility due to elevated Mn of the thermoplastic resin component constituting the outermost layer, and it might be difficult to knead the resulting component with other components due to reduced melt fluidity and mold the thermoplastic resin composition of the present disclosure. When the amount of the molecular weight adjuster used is 0.4% by mass or more, Mn of the thermoplastic resin component constituting the outermost layer is stably 30,000 or smaller so that both flexibility and moldability of a molded article (including a film) can be stably achieved. Even if the amount of the molecular weight adjuster used exceeds 10% by mass, an effect of further improving flexibility is not obtained. This merely increases the amount of the molecular weight adjuster remaining, which is originally unnecessary.

Examples of the molecular weight adjuster include: mercaptans such as n-octylmercaptan, t-octylmercaptan, n-dodecylmercaptan, t-dodecylmercaptan, and mercaptoethanol; terpene mixtures consisting of terpinolene, dipentene, t-terpinene, and a small amount of other cyclic terpenes; and halogenated hydrocarbons such as chloroform and carbon tetrachloride. Among them, alkylmercaptans such as n-octylmercaptan are preferred. One or two or more of these molecular weight adjusters can be used.

The polymerization method for the multilayer structure polymer particle (A) is not particularly limited, and a method known in the art can be adopted such as an emulsion polymerization method, a suspension/emulsion polymerization method, a solution polymerization method, or a combination thereof.

Hereinafter, preferred polymerization conditions for the multilayer structure polymer particle (A) by the emulsion polymerization method will be described as an example.

The polymerization temperature is generally 0 to 100° C.

Examples of the emulsifier include: alkali metal salts of fatty acids, such as sodium oleate, sodium laurate, and sodium stearate; sulfuric acid ester salts of fatty alcohols, such as sodium lauryl sulfate; rosinates such as potassium rosinate; and alkylarylsulfonic acids such as dodecylbenzenesulfonic acid. One or two or more of these emulsifiers can be used.

The polymerization initiator is generally a radical polymerization initiator. Persulfate, azobisisobutyronitrile, or peroxide such as benzoyl peroxide can be used alone as the radical polymerization initiator. A redox initiator consisting of an organic hydroperoxide (e.g., cumene hydroperoxide, diisopropylbenzene hydroperoxide, and p-menthane hydroperoxide) and a reducing agent (e.g., transition metal salt) in combination can also be used.

The average particle size of the multilayer structure polymer particle (A) can be controlled to 150 nm or smaller by adjusting polymerization conditions such as the amount of the emulsifier added.

After the completion of polymerization, the multilayer structure polymer particle (A) can be separated and obtained from the reaction system by a method known in the art such as acid deposition, salting out, spray drying, or cryocoagulation. For the multilayer structure polymer particle (A) thus separated and obtained, the partial fusion of outermost layers each consisting of the thermoplastic resin component between particles is acceptable.

(Block Copolymer (B))

The block copolymer is a copolymer in which a plurality of polymer blocks (polymer molecular chains) are bonded linearly or radially. The block copolymer (B) used in the present disclosure is an acrylic block copolymer having a weight-average molecular weight (Mw(B)) of 32,000 to 300,000, preferably 45,000 to 250,000, more preferably 50,000 to 200,000, measured by GPC.

The block copolymer (B) is preferably an acrylic block copolymer (BX) comprising a polymer block (b1) mainly having a methacrylic acid ester monomer unit, and a polymer block (b2) mainly having an acrylic acid ester monomer unit. This block copolymer (BX) has favorable compatibility with the multilayer structure polymer particle (A) and resins of other optional components.

The block copolymer (BX) is particularly preferably a block copolymer comprising 10 to 80% by mass of a polymer block (b1) having a methacrylic acid ester monomer unit, and 90 to 20% by mass of a polymer block (b2) having an acrylic acid ester monomer unit (wherein the total amount of the polymer block (b1) and the polymer block (b2) is defined as 100% by mass) from the viewpoint of the compatibility described above. In the block copolymer (BX), the content of the polymer block (b1) is preferably 20 to 70% by mass, and the content of the polymer block (b2) is preferably 80 to 30% by mass.

The number of the polymer block (b1) in one molecule may be one or more. When a plurality of polymer blocks (b1) are present in one molecule, the plurality of polymer blocks (b1) may have the same or different composition of a structural unit and molecular weight. Likewise, the number of the polymer block (b2) in one molecule may be one or more. When a plurality of polymer blocks (b2) are present in one molecule, the plurality of polymer blocks (b2) may have the same or different composition of a structural unit and molecular weight.

The polymer block (b1) mainly comprises a methacrylic acid ester monomer unit. The content of the methacrylic acid ester monomer unit in the polymer block (b1) is preferably 80% by mass or more, more preferably 90% by mass or more, particularly preferably 95% by mass or more, most preferably 98% by mass or more.

Hereinafter, the starting monomers of the polymer block (b1) will be described.

Examples of the methacrylic acid ester include methyl methacrylate (MMA), ethyl methacrylate, n-propyl methacrylate, isopropyl methacrylate, n-butyl methacrylate, isobutyl methacrylate, s-butyl methacrylate, t-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, 2-methoxyethyl methacrylate, glycidyl methacrylate, and allyl methacrylate (ALMA). Among them, methyl methacrylate (MMA), ethyl methacrylate, isopropyl methacrylate, n-butyl methacrylate, t-butyl methacrylate, cyclohexyl methacrylate, and isobornyl methacrylate, etc. are preferred, and methyl methacrylate (MMA) is particularly preferred, from the viewpoint of improvement in transparency and heat resistance of the thermoplastic resin composition of the present disclosure. One or two or more of these methacrylic acid esters can be used.

The polymer block (b1) may comprise an additional monomer unit without impairing the object and advantageous effects of the present disclosure. The content of the additional monomer unit in the polymer block (b1) is preferably 20% by mass or less, more preferably 10% by mass or less, particularly preferably 5% by mass or less, most preferably 2% by mass or less.

Examples of the additional monomer include acrylic acid ester, unsaturated carboxylic acid, aromatic vinyl compounds, olefin, conjugated diene, acrylonitrile, methacrylonitrile, acrylamide, methacrylamide, vinyl acetate, vinylpyridine, vinyl ketone, vinyl chloride, vinylidene chloride, and vinylidene fluoride. One or two or more of these additional monomers can be used.

The weight-average molecular weight (Mw(b1)) of the polymer block (b1) is preferably 5,000, more preferably 8,000, further preferably 12,000, particularly preferably 15,000, most preferably 20,000 as the lower limit and preferably 150,000, more preferably 120,000, particularly preferably 100,000 as the upper limit. When the block copolymer (BX) has a plurality of polymer blocks (b1), the weight-average molecular weight (Mw(b1)) is the total Mw of the plurality of polymer blocks (b1). The largest weight-average molecular weight Mw(b1) among the polymer blocks (b1) in the block copolymer (BX) is preferably 12,000 to 150,000, more preferably 15,000 to 120,000, particularly preferably 20,000 to 100,000.

The content of the polymer block (b1) in the block copolymer (BX) is preferably 10 to 80% by mass, more preferably 20% by mass to 70% by mass, from the viewpoint of transparency, flexibility, pliability, flex resistance, impact resistance, moldability, and surface smoothness of a molded article (including a film) of the thermoplastic resin composition of the present disclosure. When the block copolymer (BX) has a plurality of polymer blocks (b1), the content of the polymer block (b1) is the total content of the plurality of polymer blocks (b1).

The polymer block (b2) mainly comprises an acrylic acid ester monomer unit. The content of the acrylic acid ester monomer unit in the polymer block (b2) is preferably 45% by mass or more, more preferably 50% by mass or more, further preferably 60% by mass or more, particularly preferably 90% by mass or more.

Hereinafter, the starting monomers of the polymer block (b2) will be described.

Examples of the acrylic acid ester include methyl acrylate, ethyl acrylate, n-propyl acrylate, isopropyl acrylate, n-butyl acrylate (BA), isobutyl acrylate, s-butyl acrylate, t-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate. One or two or more of these acrylic acid esters can be used.

The polymer block (b2) may comprise an additional monomer unit without impairing the object and advantageous effects of the present disclosure. The content of the additional monomer unit in the polymer block (b2) is preferably 55% by mass or less, more preferably 50% by mass or less, particularly preferably 40% by mass or less, most preferably 10% by mass or less.

Examples of the additional monomer include methacrylic acid ester, unsaturated carboxylic acid, aromatic vinyl compounds, olefin, conjugated diene, acrylonitrile, methacrylonitrile, acrylamide, methacrylamide, vinyl acetate, vinylpyridine, vinyl ketone, vinyl chloride, vinylidene chloride, and vinylidene fluoride. One or two or more of these additional monomers can be used.

The polymer block (b2) is preferably a polymer block (b2-p) comprising an acrylic acid alkyl ester monomer unit and a (meth)acrylic acid aromatic hydrocarbon ester monomer unit from the viewpoint of transparency of the thermoplastic resin composition of the present disclosure. In this context, in the polymer block (b2-p), the content of the acrylic acid alkyl ester monomer unit is preferably 50 to 90% by mass, more preferably 60 to 80% by mass, and the content of the (meth)acrylic acid aromatic hydrocarbon ester monomer unit is preferably 50 to 10% by mass, more preferably 40 to 20% by mass.

Hereinafter, the starting monomers of the polymer block (b2-p) will be described.

Examples of the acrylic acid alkyl ester include methyl acrylate (MA), ethyl acrylate, isopropyl acrylate, n-butyl acrylate (BA), 2-ethylhexyl acrylate, and dodecyl acrylate. Among them, n-butyl acrylate (BA) and 2-ethylhexyl acrylate are preferred.

The (meth)acrylic acid aromatic hydrocarbon ester means acrylic acid aromatic hydrocarbon ester or methacrylic acid aromatic hydrocarbon ester. Examples of the (meth)acrylic acid aromatic hydrocarbon ester include phenyl acrylate, benzyl acrylate, phenoxyethyl acrylate, styryl acrylate, phenyl methacrylate, benzyl methacrylate, phenoxyethyl methacrylate, and styryl methacrylate. Among them, phenyl methacrylate, benzyl methacrylate, phenoxyethyl methacrylate, and benzyl acrylate are preferred.

The weight-average molecular weight Mw(b2) of the polymer block (b2) is preferably 5,000, more preferably 15,000, further preferably 20,000, particularly preferably 30,000, most preferably 40,000 as the lower limit and preferably 120,000, more preferably 110,000, particularly preferably 100,000 as the upper limit. Too small Mw(b2) might reduce the impact resistance of a molded article (including a film) of the thermoplastic resin composition of the present disclosure. On the other hand, too large Mw(b2) might reduce the surface smoothness of a molded article (including a film) of the thermoplastic resin composition of the present disclosure. When the block copolymer (BX) has a plurality of polymer blocks (b2), the weight-average molecular weight Mw(b2) is the total Mw of the plurality of polymer blocks (b2). The largest weight-average molecular weight Mw(b2) among the polymer blocks (b2) in the block copolymer (BX) is preferably 20,000 to 120,000, more preferably 30,000 to 110,000, particularly preferably 40,000 to 100,0000.

The content of the polymer block (b2) in the block copolymer (BX) is preferably 10 to 90% by mass, more preferably 20 to 80% by mass, from the viewpoint of transparency, flexibility, pliability, flex resistance, impact resistance, moldability, and surface smoothness of a molded article (including a film) of the thermoplastic resin composition of the present disclosure. When the block copolymer (BX) has a plurality of polymer blocks (b2), the content of the polymer block (b2) is the total content of the plurality of polymer blocks (b2).

The bonded form of the polymer block (b1) and the polymer block (b2) in the block copolymer (BX) is not particularly limited. Examples of the block copolymer (BX) include linear block copolymers including: a diblock copolymer having a (b1)-(b2) structure where one end of the polymer block (b2) is connected to one end of the polymer block (b1); a triblock copolymer having a (b2)-(b1)-(b2) structure where one end of the polymer block (b2) is connected to each of both ends of the polymer block (b1); and a triblock copolymer having a (b1)-(b2)-(b1) structure where one end of the polymer block (b1) is connected to each of both ends of the polymer block (b2).

Other examples thereof include star block copolymers or branched structure block copolymers including: a star block copolymer having a [(b1)-(b2)-]$_m$X structure where a plurality of arm block copolymers each having a (b1)-(b2) structure are mutually connected at their one end to assume a radial structure; a star block copolymer having a [(b2)-(b1)-]$_m$X structure where a plurality of arm block copolymers each having a (b2)-(b1) structure are mutually connected at their one end to assume a radial structure; a star block copolymer having a $[(b1)-(b2)-(b1)-]_mX$ structure where a plurality of arm block copolymers each having a (b1)-(b2)-(b1) structure are mutually connected at their one end to assume a radial structure; and a block copolymer having a $[(b2)-(b1)-(b2)-]_mX$ structure where a plurality of arm block copolymers each having a (b2)-(b1)-(b2) structure are mutually connected at their one end to assume a radial structure. In these formulas, the symbol X represents a coupling agent residue, and m represents the number of arm block copolymers.

Among them, diblock copolymers, triblock copolymers, and star block copolymers are preferred, a diblock copolymer having a (b1)-(b2) structure, a triblock copolymer having a (b1)-(b2)-(b1) structure, a star block copolymer having a $[(b1)-(b2)-]_mX$ structure, and a star block copolymer having a $[(b1)-(b2)-(b1)-]_mX$ structure are more preferred, and a triblock copolymer having a (b1)-(b2)-(b1) structure is particularly preferred.

The block copolymer (BX) may have a polymer block (b3) composed mainly of an additional monomer unit other than the methacrylic acid ester monomer unit and the acrylic acid ester monomer unit. Examples of the additional monomer include: olefins such as ethylene, propylene, 1-butene, isobutylene, and 1-octene; conjugated dienes such as butadiene, isoprene, and myrcene; aromatic vinyl compounds such as styrene (St), α-methylstyrene, p-methylstyrene, and m-methylstyrene; and vinyl acetate, vinylpyridine, acrylonitrile, methacrylonitrile, vinyl ketone, vinyl chloride, vinylidene chloride, vinylidene fluoride, acrylamide, methacrylamide, e-caprolactone, and valerolactone.

The bonded form of the polymer blocks (b1) to (b3) is not particularly limited. Examples of the block copolymer (BX) comprising the polymer blocks (b1) to (b3) include a tetrablock copolymer having a (b1)-(b2)-(b1)-(b3) structure, and a pentablock copolymer having a (b3)-(b1)-(b2)-(b1)-(b3) structure. The number of the polymer block (b3) in one molecule may be one or more. When a plurality of polymer blocks (b3) are present in one molecule, the plurality of polymer blocks (b3) may have the same or different composition of a structural unit and molecular weight.

The block copolymer (B) may have a functional group such as a hydroxy group, a carboxy group, an acid anhydride group, or an amino group, if necessary, in a molecular chain and/or at a molecular chain end.

The weight-average molecular weight (Mw(B)) of the block copolymer (B) is 32,000 to 300,000, preferably 40,000 to 250,000, more preferably 45,000 to 230,000, particularly preferably 50,000 to 200,000. When Mw(B) falls within the range described above, the amount of unmelted matter, which is responsible for the generation of granules in a molded article (including a film), at the time of melt kneading of starting materials in the production of the thermoplastic resin composition can be a very small amount.

In the block copolymer (B), a molecular weight distribution which is the ratio of the weight-average molecular weight (Mw(B)) to the number-average molecular weight (Mn(B)) (Mw(B)/Mn(B)) is preferably 1.0 to 2.0, more preferably 1.0 to 1.6. When Mw(B)/Mn(B) falls within the range described above, the amount of unmelted matter, which is responsible for the generation of granules in a molded article (including a film), at the time of melt kneading of starting materials in the production of the thermoplastic resin composition can be a very small amount.

The refractive index of the block copolymer (B) is not particularly limited and is preferably 1.485 to 1.495, more preferably 1.487 to 1.493. When the refractive index falls within the range described above, the thermoplastic resin composition of the present disclosure has high transparency. In the present specification, "refractive index" means a value measured using D line (wavelength: 587.6 nm) as to a film-shaped test specimen.

The method for producing the block copolymer (B) is not particularly limited and is generally a method of performing living polymerization for each polymer block. Examples of the living polymerization method include a method of performing anionic polymerization in the presence of a mineral acid salt such as alkali metal or alkaline earth metal salt using an organic alkali metal compound as a polymerization initiator, a method of performing anionic polymerization in the presence of an organoaluminum compound using an organic alkali metal compound as a polymerization initiator, a method of performing polymerization using an organic rare earth metal complex as a polymerization initiator, and a method of performing radical polymerization in the presence of a copper compound using a-halogenated ester compound as a polymerization initiator. Other examples thereof include a method of performing polymerization using a polyvalent radical polymerization initiator or a polyvalent radical chain transfer agent. Among them, a method of performing anionic polymerization in the presence of an organoaluminum compound using an organic alkali metal compound as a polymerization initiator is particularly preferred because the method produces the block copolymer (B) with high purity, easily controls the composition and molecular weight of each block, and is economical.

(Mass Ratio of Component (A) to Component (B))

In the thermoplastic resin composition of the present disclosure, the mass ratio of the multilayer structure polymer particle (A) to the block copolymer (B) ((A)/(B)) is 1/99 to 99/1 from the viewpoint of achieving both flexibility and moldability. The mass ratio ((A)/(B)) is preferably 51/49 or more, more preferably 55/45 or more, particularly preferably 60/40 or more. The mass ratio ((A)/(B)) is preferably 97/3 or less, more preferably 95/5 or less, particularly preferably 90/10 or less.

In the thermoplastic resin composition of the present disclosure, the content of the multilayer structure polymer particle (A) is preferably 50% by mass or more, more preferably 60% by mass or more.

The method for mixing the multilayer structure polymer particle (A) with the block copolymer (B) is not particularly limited and is preferably a melt mixing method. In the melt mixing method, melt kneading can be performed, if necessary in an inert gas (e.g., nitrogen gas, argon gas, and helium gas) atmosphere, using a melt kneading machine such as a single-screw or twin or more multi-screw kneading machine, an open roll, a Banbury mixer, or a kneader.

(Optional Component)

The thermoplastic resin composition of the present disclosure may further contain a methacrylic resin (C) in addition to the multilayer structure polymer particle (A) and the block copolymer (B). The methacrylic resin (C) has a number-average molecular weight (Mn) of preferably 10,000 to 200,000, more preferably 15,000 to 150,000, measured by GPC. In the case of using the methacrylic resin (C) having Mn that falls within the range described above, the thermoplastic resin composition of the present disclosure has better moldability. The content of the methacrylic resin (C) is not particularly limited and is preferably 1 to 20 parts by mass, more preferably 1 to 10 parts by mass, with respect to 100 parts by mass in total of the multilayer structure polymer particle (A) and the methacrylic resin (C) from the viewpoint of improvement in flexibility and moldability of a molded article (including a film) of the thermoplastic resin composition of the present disclosure.

The methacrylic resin (C) is a resin comprising a methyl methacrylate (MMA) monomer unit. The methacrylic resin (C) may be a homopolymer of MMA (polymethyl methacrylate (PMMA)) or may be a random copolymer of a plurality of monomers including MMA. The methacrylic resin (C) is preferably a methacrylic resin (CX) consisting of 40 to 100% by mass (preferably 70 to 100% by mass) of a MMA unit, and 60 to 0% by mass (preferably 30 to 0% by mass) of an additional monomer unit.

Examples of the additional monomer copolymerizable with MMA include other methacrylic acid esters. Examples of such methacrylic acid esters include: methacrylic acid alkyl esters such as ethyl methacrylate, n-propyl methacrylate, isopropyl methacrylate, n-butyl methacrylate, isobutyl methacrylate, t-butyl methacrylate, pentyl methacrylate, hexyl methacrylate, heptyl methacrylate, 2-ethylhexyl methacrylate, nonyl methacrylate, decyl methacrylate, and dodecyl methacrylate; methacrylic acid cycloalkyl esters such as 1-methylcyclopentyl methacrylate, cyclohexyl methacrylate, cycloheptyl methacrylate, cyclooctyl methacrylate, and tricyclo[5.2.1.0$^{2,6}$]dec-8-yl methacrylate; methacrylic acid aryl esters such as phenyl methacrylate; and methacrylic acid aralkyl esters such as benzyl methacrylate. Ethyl methacrylate, n-propyl methacrylate, isopropyl methacrylate, n-butyl methacrylate, isobutyl methacrylate, and t-butyl methacrylate are preferred from the viewpoint of availability.

Other examples of the additional monomer include other monomers other than the methacrylic acid esters. Examples of such other monomers include acrylic acid esters such as methyl acrylate (MA), ethyl acrylate, n-propyl acrylate, isopropyl acrylate, n-butyl acrylate (BA), isobutyl acrylate, t-butyl acrylate, hexyl acrylate, 2-ethylhexyl acrylate, nonyl acrylate, decyl acrylate, dodecyl acrylate, stearyl acrylate, 2-hydroxyethyl acrylate, 2-hydroxypropyl acrylate, 4-hydroxybutyl acrylate, cyclohexyl acrylate, 2-methoxyethyl acrylate, 3-methoxybutyl acrylate, trifluoromethyl acrylate, trifluoroethyl acrylate, pentafluoroethyl acrylate, glycidyl acrylate, allyl acrylate, phenyl acrylate, toluyl acrylate, benzyl acrylate, isobornyl acrylate, and 3-dimethylaminoethyl acrylate. Among them, acrylic acid esters such as methyl acrylate (MA), ethyl acrylate, n-propyl acrylate, isopropyl acrylate, n-butyl acrylate (BA), isobutyl acrylate, and t-butyl acrylate are preferred, methyl acrylate (MA) and ethyl acrylate are more preferred, and methyl acrylate (MA) is particularly preferred, from the viewpoint of availability.

The thermoplastic resin composition of the present disclosure may contain an additional polymer, if necessary, in addition to the multilayer structure polymer particle (A), the block copolymer (B), and the methacrylic resin (C) without impairing the advantageous effects of the present disclosure. Examples of the additional polymer include: olefin resins such as polyethylene, polypropylene, polybutene-1, poly-4-methylpentene-1, and polynorbornene; ethylene ionomers; styrene resins such as polystyrene, styrene-maleic anhydride copolymers, high-impact polystyrene, AS resin, ABS resin, AES resin, AAS resin, ACS resin, and MBS resin; methyl methacrylate-styrene copolymers; ester resins such as polyethylene terephthalate and polybutylene terephthalate; amide resins such as nylon 6, nylon 66, and polyamide elastomers; other thermoplastic resins such as polyphenylene sulfide, polyether ether ketone, polysulfone, polyphenylene oxide, polyimide, polyetherimide, polycarbonate, polyvinyl chloride, polyvinylidene chloride, polyvinylidene fluoride, polyvinyl alcohol, ethylene-vinyl alcohol copolymers, polyacetal, and phenoxy resins; thermosetting resins such as phenol resins, melamine resins, silicone resins, and epoxy resins; polyurethane; modified polyphenylene ether; silicone-modified resins; acrylic rubber and silicone rubber; styrene thermoplastic elastomers such as SEPS, SEBS, and SIS; and olefin rubbers such as IR, EPR, and EPDM. One or two or more of these additional polymers can be used.

The thermoplastic resin composition of the present disclosure may contain various additives, if necessary. Examples of the additives include antioxidants, thermal degradation inhibitors, ultraviolet absorbers, light stabilizers, lubricants, mold release agents, polymer processing aids, antistatic agents, flame retardants, dyes or pigments, light diffusing agents, delusterants, agglutination inhibitors, impact resistance modifiers, and phosphors. The contents of these additives can be appropriately set without impairing the advantageous effects of the present disclosure. For example, preferably, the content of the antioxidant is 0.01 to 1 parts by mass, the content of the ultraviolet absorber is 0.01 to 3 parts by mass, the content of the light stabilizer is 0.01 to 3 parts by mass, the content of the lubricant is 0.01 to 3 parts by mass, the content of the dye or the pigment is 0.01 to 3 parts by mass, and the content of the agglutination inhibitor is 0.001 to 1 parts by mass, with respect to 100 parts by mass of the thermoplastic resin composition.

The antioxidant is effective for preventing the oxidation degradation of resins in itself in the presence of oxygen. Examples thereof include phosphorus-based antioxidants, phenol-based antioxidants, sulfur-based antioxidants, and amine-based antioxidants. Among them, phosphorus-based antioxidants and phenol-based antioxidants are preferred, and use of a phenol-based antioxidant alone or combined use of a phosphorus-based antioxidant and a phenol-based antioxidant is more preferred, from the viewpoint of an effect of preventing degradation of optical characteristics ascribable to staining. For the combined use of a phosphorus-based antioxidant and a phenol-based antioxidant, the phosphorus-based antioxidant/phenol-based antioxidant mass ratio is preferably 0.2/1 to 2/1 for use, more preferably 0.5/1 to 1/1 for use.

Preferred examples of the phosphorus-based antioxidant include 2,2-methylenebis(4,6-di-t-butylphenyl)octyl phosphite ("ADK STAB HP-10" manufactured by ADEKA Corp.), tris(2,4-di-t-butylphenyl)phosphite ("IRGAFOS 168" manufactured by BASF Japan Ltd.), and 3,9-bis(2,6-di-t-butyl-4-methylphenoxy)-2,4,8,10-tetraoxa-3,9-diphosphaspiro[5.5]undecane ("ADK STAB PEP-36" manufactured by ADEKA Corp.).

Preferred examples of the phenol-based antioxidant include pentaerythrityl-tetrakis[3-(3,5-di-t-butyl-4-hydroxyphenyl)propionate] ("IRGANOX 1010" manufactured by BASF Japan Ltd.), and octadecyl-3-(3,5-di-t-butyl-4-hydroxyphenyl)propionate ("IRGANOX 1076" manufactured by BASF Japan Ltd.).

The ultraviolet absorber is a compound regarded as having the ability to absorb ultraviolet ray and having the function of mainly converting light energy to heat energy. Examples of the ultraviolet absorber include benzophenones, benzotriazoles, triazines, benzoates, salicylates, cyano acrylates, oxalic anilides, malonic acid esters, and formamidines. Among them, benzotriazoles and triazines are preferred. One or two or more of these ultraviolet absorbers can be used.

The benzotriazoles are highly effective for suppressing reduction in optical characteristics, such as staining, ascribable to ultraviolet irradiation and are therefore suitable in the case of applying the thermoplastic resin composition of the present disclosure to an optical purpose. Preferred examples of the benzotriazoles include 4-methyl-2-(2H-benzotriazol-2-yl)phenol ("trade name JF-77" manufactured by Johoku Chemical Co., Ltd.), 2-(2H-benzotriazol-2-yl)-4-(1,1,3,3-tetramethylbutyl)phenol ("trade name TINUVIN 329" manufactured by BASF Japan Ltd.), 2-(2H-benzotriazol-2-yl)-4,6-bis(1-methyl-1-phenylethyl)phenol ("trade name TINUVIN 234" manufactured by BASF Japan Ltd.), and 2,2'-methylenebis[6-(2H-benzotriazol-2-yl)-4-t-octylphenol] ("ADK STAB LA-31" manufactured by ADEKA Corp.).

Triazines are preferably used as the ultraviolet absorber when efficient absorption of a wavelength around 380 nm is desired. Examples of such an ultraviolet absorber include 2,4,6-tris(2-hydroxy-4-hexyloxy-3-methylphenyl)-1,3,5-triazine ("ADK STAB LA-F70" manufactured by ADEKA Corp.), and its analog hydroxyphenyltriazine-based ultraviolet absorbers ("TINUVIN 477" and "TINUVIN 460" manufactured by BASF Japan Ltd.).

The light stabilizer is a compound regarded as having the function of mainly scavenging radicals generated by oxidation ascribable to light. Preferred examples of the light stabilizer include hindered amines such as compounds having a 2,2,6,6-tetraalkylpiperidine backbone. Examples thereof include bis(2,2,6,6-tetramethyl-4-piperidyl)sebacate ("ADK STAB LA-77Y" manufactured by ADEKA Corp.).

The lubricant is a compound regarded as being effective for improving mold release properties and processability, etc. by adjusting the lubricity between a resin and metal surface and preventing adhesion or sticking. Examples thereof include higher alcohols, hydrocarbons, fatty acids, fatty acid metal salts, aliphatic amides, and fatty acid esters. Among them, aliphatic monohydric alcohols having 12 to 18 carbon atoms and aliphatic amides are preferred, and aliphatic amides are more preferred, from the viewpoint of compatibility with the thermoplastic resin composition of the present disclosure. The aliphatic amides are classified into saturated aliphatic amides and unsaturated aliphatic amides. Unsaturated aliphatic amides are more preferred because a slipping effect based on the prevention of sticking is expected. Examples of the unsaturated aliphatic amides include N,N'-ethylenebisoleic acid amide ("SLIPAX O" manufactured by Nippon Kasei Co., Ltd.), and N,N'-dioleyladipic acid amide ("SLIPAX ZOA" manufactured by Nippon Kasei Co., Ltd.).

In the case of allowing the thermoplastic resin composition of the present disclosure to contain the additional polymer and/or the additives, these components may be added during polymerization for the multilayer structure polymer particle (A) and/or the block copolymer (B), may be added during mixing of the multilayer structure polymer particle (A) with the block copolymer (B), or may be added after mixing of the multilayer structure polymer particle (A) and the block copolymer (B).

The acrylic thermoplastic resin composition of the present disclosure can have excellent characteristics such as transparency, weather resistance, and scratch resistance, which are originally possessed by acrylic resins.

The thermoplastic resin composition of the present disclosure comprises the specific multilayer structure polymer particle (A) and can therefore have favorable flexibility and rubber elasticity. Furthermore, in the thermoplastic resin composition of the present disclosure, combined use of the specific multilayer structure polymer particle (A) and the specific block copolymer (B) can improve poor moldability of the multilayer structure polymer particle (A) alone and achieve both flexibility and moldability while securing transparency.

Since the thermoplastic resin composition of the present disclosure is excellent in flexibility, the resulting film has a small storage modulus and large tensile elongation at break and is less likely to be broken.

Since the thermoplastic resin composition of the present disclosure is excellent in rubber elasticity, the resulting molded article (including a film) has small compression set and is excellent in elastic recovery.

The thermoplastic resin composition of the present disclosure containing the block copolymer (B) having a weight-average molecular weight (Mw) of 32,000 to 300,000 is excellent in moldability. Therefore, the maximum winding speed of a film can be set to a high value in film formation by, for example, a T-die method, and productivity is excellent. The resulting molded article (including a film) is prevented from generating granules in the molded article and has favorable surface appearance.

As described above, the present disclosure can provide a multilayer structure polymer particle-containing thermoplastic resin composition excellent in transparency, flexibility, rubber elasticity, and moldability.

"Molded Article (Including Film) and Laminate (Including Laminated Film)"

The acrylic thermoplastic resin composition of the present disclosure described above can be molded to obtain a molded article having an arbitrary shape such as a pellet, film, pipe, hollow, or box shape.

Examples of the molding method include: extrusion molding methods such as extrusion molding, T-die laminate molding, and extrusion coating; injection molding methods such as insert injection molding, two-color injection molding, core-back injection molding, sandwich injection molding, and injection press molding; blow molding methods; calender molding methods; press molding methods; slush molding methods; hollow molding methods; vacuum molding methods; and foaming molding methods.

One form of the molded article is a film. Usually, molded articles having a thickness of 5 to 300 μm are typically classified into "film", and molded articles thicker than 300 μm are typically classified into "sheet". In the present specification, no clear distinction is made between the film and the sheet, and both the film and the sheet are collectively referred to as "film". For the purpose of "film" according to general classification, the thickness is preferably 100 to 200 μm. For the purpose of "sheet" according to general classification, the thickness is preferably 1.0 to 2.0 mm.

The film formation method is preferably an extrusion molding method of melt-extruding the thermoplastic resin composition of the present disclosure described above using an extruder, and contacting the obtained melt extrudate with at least one cooling roll having a surface temperature of preferably 35 to 95° C., more preferably 40 to 90° C., particularly preferably 45 to 85° C., followed by film formation. Examples of the melt extrusion method include T-die and inflation methods. A T-die method is preferred from the viewpoint of thickness accuracy and productivity. The melt extrusion temperature is preferably 130 to 240° C. Examples of the extruder include single-screw extruders and twin or more multi-screw extruders.

The T-die method is a film formation method of spreading a melted resin composition at a substantially uniform thickness and the desired film width, extruding the melted resin composition into a film using a slit-shaped lip, and contacting the resulting extrudate with a cooling roll for cooling. In the T-die method, it is generally desired to set the rotational speed (film winding speed) of the cooling roll to a relatively high value, for thin film formation and improvement in productivity. In this case, depending on composition, the resulting film may have an uneven width and thickness and may undergo waviness or break. The thermoplastic resin composition of the present disclosure is excellent in moldability. Therefore, even in the case of setting the film winding speed to a relatively high value in film formation by the T-die method, the resulting film is less likely to have an uneven width and thickness and is less likely to undergo waviness and break. Thus, the thermoplastic resin composition of the present disclosure is excellent in film productivity.

The cooling roll is, for example, a roll whose surface temperature is adjustable by a coolant travelling down within the cooling roll. The melt extrudate discharged from a T-die is contacted with the cooling roll and cooled to around the surface temperature of the cooling roll. Examples of the cooling roll include: polishing rolls having a mirrored roll surface; rubber rolls having a rubber wrapped around a metal, stainless steel, or carbon steel core surface; and embossed rolls having a fine embossed pattern (indented pattern) on a roll surface. The number of the cooling roll may be one or more. The melt extrudate may be sandwiched between a pair of cooling rolls.

The laminate (including a laminated film) of the present disclosure has at least one acrylic thermoplastic resin layer consisting of the acrylic thermoplastic resin composition of the present disclosure described above, and at least one additional resin layer. One form of the laminate is a laminated film. The thickness of the additional resin layer is not particularly limited and is preferably 0.1 to 5.0 mm.

Examples of the constituent resin of the additional resin layer include, but are not particularly to: thermoplastic resins including olefin resins such as polyethylene and polypropylene, styrene resins such as polystyrene and ABS resin, and other resins such as methacrylic resins, polyester, polyamide, polycarbonate, polyvinyl chloride, polyvinylidene chloride, polyvinyl alcohol, ethylene-vinyl alcohol copolymers, polyacetal, polyvinylidene fluoride, polyurethane, modified polyphenylene ether, polyphenylene sulfide, silicone-modified resins, polyether ether ketone, polysulfone, polyphenylene oxide, polyimide, polyetherimide, and phenoxy resins; thermosetting resins such as phenol resins, melamine resins, silicone resins, and epoxy resins; and energy line-curable resins. One or two or more of these constituent resins of the additional resin layer can be used. Among them, thermoplastic resins are preferred, and at least one thermoplastic resin selected from the group consisting of methacrylic resin, polyvinyl chloride, ABS resin, and polycarbonate is preferred.

The additional resin layer may contain various additives such as stabilizers, antioxidants, lubricants, processing aids, plasticizers, impact resistance imparting agents, foaming agents, fillers, antimicrobial agents, fungicides, mold release agents, antistatic agents, colorants, ultraviolet absorbers, light stabilizers, heat stabilizers, and flame retardants, if necessary.

Examples of the method for producing the laminated film include coextrusion, coating, thermal lamination, dry lamination, wet lamination, and hot melt lamination methods. Also, a film consisting of the acrylic thermoplastic resin layer of the present disclosure and a film consisting of the additional resin layer can be laminated by an extrusion lamination method.

Examples of the purposes of the molded article (including a film) and the laminate (including a laminated film) of the present disclosure include: lighting parts such as fluorescent lamp covers, mood lighting covers, lampshades, luminous ceilings, light walls, and chandeliers; automobile parts such as side moldings, emblems, and soft members for interior decoration; electric parts such as switch covers and touch panels; optical films provided with a lens or prism pattern, such as reflectors, three-dimensional films, and retroreflection films; films for packaging; desk mats; and protective films covering indoor building members such as door packings and stair rails, or outdoor building members such as flooring materials, walling materials, and roofing materials.

The molded article and the laminate of the present disclosure are excellent in characteristics such as transparency, flexibility, rubber elasticity, moldability, weather resistance, scratch resistance, and surface appearance. The molded article and the laminate of the present disclosure has high transparency, a protective function against external stimulation such as light or scratching, abundant flexibility, and excellent elastic recovery and as such, can be suitably used in protective films covering indoor and outdoor building materials, etc.

EXAMPLES

Hereinafter, the present disclosure will be described with reference to Production Examples, Examples, and Comparative Examples.

[Evaluation Items and Evaluation Methods]

Evaluation items and evaluation methods in Production Examples, Examples and Comparative Examples are as follows.

(Average Particle Size)

The average particle sizes of multilayer structure polymer particles (A) and (Y) were determined by measuring a sample collected from latex after the completion of polymerization for the multilayer structure polymer particle (A) or (Y) by the dynamic light scattering method using a light scattering photometer "DLS-600" manufactured by Otsuka Electronics Co., Ltd., followed by analysis by the cumulant method.

(Total Light Transmittance)

A 50 mm×50 mm test specimen was cut out of a film (thickness: 0.5 mm) obtained in each of Examples and Comparative Examples, and its total light transmittance was measured using a haze meter ("HM-150" manufactured by Murakami Color Research Laboratory Co., Ltd.) in accordance with JIS K7361-1.

(Haze)

A 50 mm×50 mm test specimen was cut out of a film (thickness: 0.5 mm) obtained in each of Examples and Comparative Examples, and its haze was measured using a haze meter ("HM-150" manufactured by Murakami Color Research Laboratory Co., Ltd.) in accordance with JIS K7136.

(Storage Modulus)

A test specimen of 20 mm in length and 3 mm in width was cut out of a film (thickness: 0.5 mm) obtained in each of Examples and Comparative Examples, and dynamic viscoelasticity measurement was carried out in accordance with JIS K7244-1 and JIS K7244-4. The dynamic viscoelastometer used was "Rheogel-E4000" manufactured by UBM Asia Ltd. Sinusoidal oscillation with a set frequency and amplitude was applied to the sample under heating, and stress response generated at that time was detected to determine the phase difference between a dynamic stress waveform and a dynamic displacement waveform. Each data such as a storage modulus, a loss modulus, and tan δ was plotted against the temperature of the measurement region according to an arithmetic expression based on the linear viscoelasticity theory to obtain a DMTA curve, etc. The main measurement conditions were set as described below. In this way, the storage modulus at 30° C. was determined. <Measurement conditions> Measurement frequency: 1 Hz, load: 1 kg, measurement mode: temperature dependence, measurement temperature: 25 to 150° C., heating conditions: 3° C./min.

(Tensile Elongation at Break)

A test specimen of 150 mm in length and 10 mm in width was cut out of a film (thickness: 0.5 mm) obtained in each of Examples and Comparative Examples, and its tensile elongation at break was measured using an autograph ("AG-1 S" manufactured by Shimadzu Corp.) in accordance with JIS K6251. The test specimen was loaded in the autograph under conditions involving an inter-clamp distance of 110 mm and uniaxially drawn at a tension rate of 500 mm/min in an environment of 23° C. and 50% relative humidity. The elongation of the test specimen when the test specimen was broken was determined as the tensile elongation at break.

(Compression Set)

A film obtained in each of Examples and Comparative Examples was cut into a round shape of 29 mm in diameter. A plurality of such round films were laminated such that the thickness was 12 mm (d0) to prepare a columnar test specimen. The compression set was measured using the obtained columnar test specimen in accordance with JIS K6262. The columnar test specimen was compressively deformed by 25% using a spacer having a thickness of 9.3 mm (d1). The compressed state was kept at 70° C. for 24 hours, and the compression was then canceled. Then, the columnar test specimen was left standing for 30 minutes in an environment of 23° C. and 50% relative humidity, and the thickness (d2: mm) of the columnar test specimen was then measured. The compression set was determined according to the expression given below. There existed a test specimen that was unable to be compressed (Comparative Example 3) and a test specimen that made no recovery from strain (Comparative Example 9). [Compression set (%)]=(d0−d2)/(d0−d1)×100

(Maximum Winding Speed)

A thermoplastic resin composition obtained in each of Examples and Comparative Examples was dried at 70° C. for 24 hours. The thermoplastic resin composition was extruded from a T-die of 150 mm in width set to 220° C. using a 20 mmϕ single-screw extruder (manufactured by OCS GmbH) with an extrusion temperature set to 140 to 210° C. This extrudate was taken over by a cooling roll set to 45° C. to obtain a film. In this operation, the maximum winding speed was determined by the following method: film formation was started at a winding speed of 0.5 m/mm, and the presence or absence of break of the film extruded from the T-die was observed over time. The winding speed was elevated by 0.1 m/mm every 1 minute. The winding speed at which the film started to be broken was determined as the maximum winding speed.

[Starting Material]

The starting materials used in Examples and Comparative Examples are as follows.

Production Example 1: Multilayer Structure Polymer Particle (A-1)

In a polymerization vessel equipped with a stirring blade, a condenser, and a dropping funnel, 150 parts by mass of distilled water, 1.3 parts by mass of an emulsifier ("NEOPELEX G-15" manufactured by Kao Corp.), and 1.0 part by mass of a dispersant ("POIZ 520" manufactured by Kao Corp.) were placed in a nitrogen atmosphere and uniformly dissolved by heating to 80° C. Subsequently, 0.05 parts by mass of potassium peroxodisulfate was added thereto at the same temperature as above. Then, a mixture consisting of 41.25 parts by mass of n-butyl acrylate (BA) as an acrylic acid ester monomer, 8.75 parts by mass of styrene (St) as an additional monofunctional monomer, 0.3 parts by mass of allyl methacrylate (ALMA) as a polyfunctional monomer, and 0.25 parts by mass of a surfactant ("ADEKA COL CS-141E" manufactured by ADEKA Corp.) was added dropwise thereto over 60 minutes through the dropping funnel to form the first layer (layer (Ia)). After the completion of dropwise addition, the reaction was further continued at 80° C. for 1 hour. 99% or more of each monomer was confirmed to be consumed by gas chromatography.

Subsequently, to the obtained copolymer latex, 0.02 parts by mass of potassium peroxodisulfate was added, and then, a mixture consisting of 15.81 parts by mass of n-butyl acrylate (BA) as an acrylic acid ester monomer, 3.19 parts by mass of styrene (St) as an additional monofunctional monomer, 1.0 part by mass of methyl methacrylate (MMA) as an additional monofunctional monomer, 0.16 parts by mass of allyl methacrylate (ALMA) as a polyfunctional monomer, and 0.1 parts by mass of a surfactant ("ADEKA COL CS-141E") was added dropwise over 40 minutes through the dropping funnel to form the second layer (layer (Ib)). After the completion of dropwise addition, the reaction was further continued at 80° C. for 1 hour. 99% or more of each monomer was confirmed to be consumed by gas chromatography.

Subsequently, to the obtained copolymer latex, 0.03 parts by mass of potassium peroxodisulfate was added, and then, a mixture consisting of 28.5 parts by mass of methyl methacrylate (MMA) as a methacrylic acid ester monomer, 1.5 parts by mass of methyl acrylate (MA) as an additional monomer, 0.3 parts by mass of n-octylmercaptan, and 0.15 parts by mass of a surfactant ("ADEKA COL CS-141E") was added dropwise over 40 minutes through the dropping funnel to form the third layer (layer (II)). After the completion of dropwise addition, the reaction was further continued at 80° C. for 1 hour. 99.9% or more of each monomer was confirmed to be consumed by gas chromatography. The polymerization was terminated. The obtained latex had an average particle size of 100 nm measured by the dynamic light scattering method of the particles.

The obtained latex was cooled at −30° C. for 24 hours and freeze-aggregated. Then, the aggregate was thawed and isolated. The resultant was dried under reduced pressure at 50° C. for 2 days to obtain a powdery multilayer structure polymer particle (A-1) having a three-layer structure. The number-average molecular weight (Mn) of the polymer component constituting the outermost layer was 25,000. The particle structure is shown in Table 1.

Production Example 2: Multilayer Structure Polymer Particle (Y-1) for Comparison In a polymerization vessel equipped with a stirring blade, a condenser, and a dropping funnel, 200 parts by mass of distilled water, 1.3 parts by mass of an emulsifier ("NEOPELEX G-15" manufactured by Kao Corp.), and 0.05 parts by mass of sodium carbonate were placed in a nitrogen atmosphere and uniformly dissolved by heating to 80° C. Subsequently, 0.01 parts by mass of potassium peroxodisulfate was added thereto at the same temperature as above. Then, a mixture consisting of 2.52 parts by mass of n-butyl acrylate (BA) as an acrylic acid ester monomer, 2.52 parts by mass of methyl methacrylate (MMA) as an additional monofunctional monomer, and 0.01 parts by mass of allyl methacrylate (ALMA) as a polyfunctional monomer was added dropwise thereto over 30 minutes through the dropping funnel to form the first layer (layer (Ia)). After the completion of dropwise addition, the reaction was further continued at 80° C. for 30 minutes. 99% or more of each monomer was confirmed to be consumed by gas chromatography.

Subsequently, to the obtained copolymer latex, 0.09 parts by mass of potassium peroxodisulfate was added, and then, a mixture consisting of 28.50 parts by mass of n-butyl acrylate (BA) as an acrylic acid ester monomer, 1.52 parts by mass of methyl methacrylate (MMA) as an additional monoftmctional monomer, and 0.9 parts by mass of allyl methacrylate (ALMA) as a polyfunctional monomer was added dropwise over 50 minutes through the dropping funnel to form the second layer (layer (Ib)). After the completion of dropwise addition, the reaction was further continued at 80° C. for 30 minutes. 99% or more of each monomer was confirmed to be consumed by gas chromatography.

Subsequently, a mixture consisting of 56.82 parts by mass of methyl methacrylate (MMA) as a methacrylic acid ester monomer, 8.12 parts by mass of n-butyl acrylate (BA) as an additional monomer, and 0.19 parts by mass of n-octylmercaptan was added dropwise thereto over 100 minutes through the dropping funnel to form the third layer (layer (I)). After the completion of dropwise addition, the reaction was further continued at 80° C. for 1 hour. 99.9% or more of each monomer was confirmed to be consumed by gas chromatography. The polymerization was terminated. The obtained latex had an average particle size of 100 nm measured by the dynamic light scattering method of the particles.

The latex was cooled at −30° C. for 24 hours and freeze-aggregated. Then, the aggregate was thawed and isolated. The resultant was dried under reduced pressure at 50° C. for 2 days to obtain a powdery multilayer structure polymer particle (Y-1) having a three-layer structure. The number-average molecular weight (Mn) of the polymer component constituting the outermost layer was 33,000. The particle structure is shown in Table 1.

Production Example 3: Multilayer Structure Polymer Particle (Y-2) for Comparison In a polymerization vessel equipped with a stirring blade, a condenser, and a dropping funnel, 200 parts by mass of distilled water and 1.0 part by mass of an emulsifier (sodium dioctylsulfosuccinate) were placed in a nitrogen atmosphere and uniformly dissolved. Subsequently, a mixture consisting of 25.5 parts by mass of n-butyl acrylate (BA), 4.5 parts by mass of methyl methacrylate (MMA), 0.03 parts by mass of triallyl isocyanurate (TAC) as a polyfunctional monomer, and 0.03 parts by mass of cumene hydroperoxide (CHP) as a catalyst was injected into the polymerization vessel at the same temperature as above. The polymerization temperature was set to 40° C. with stirring in a nitrogen stream. Then, a solution containing 0.03 parts by mass of sodium formaldehyde sulfoxylate dissolved in a small amount of water was gradually added thereto so that polymerization was started to form the first layer (layer (Ia)). Approximately 4 hours later, 95% or more of each monomer was confirmed to be consumed by gas chromatography.

Subsequently, the polymerization temperature was raised to 80° C. A solution containing 0.2 parts by mass of sodium formaldehyde sulfoxylate dissolved in a small amount of water was added into the polymerization vessel. A mixture consisting of 10 parts by mass of methyl methacrylate (MMA), 10 parts by mass of n-butyl acrylate (BA), and 0.3 parts by mass of cumene hydroperoxide (CHP) as a catalyst was added dropwise thereto over approximately 120 minutes through the dropping funnel to form the second layer (layer (Ib)). Further, a mixture consisting of 40 parts by mass of methyl methacrylate (MMA), 10 parts by mass of n-butyl acrylate (BA), and 0.3 parts by mass of cumene hydroperoxide as a catalyst was added dropwise thereto over approximately 240 minutes through the dropping funnel to form the third layer (layer II).

The latex was cooled at −30° C. for 24 hours and freeze-aggregated. Then, the aggregate was thawed and isolated. The resultant was dried under reduced pressure at 50° C. for 2 days to obtain a powdery multilayer structure polymer particle (Y-2) having a three-layer structure. The number-average molecular weight (Mn) of the polymer component constituting the outermost layer was 57,000. The particle structure is shown in Table 1.

(Block Copolymer (B))

Block copolymer (B-1): a triblock copolymer consisting of [methyl methacrylate (MMA) polymer block (b1)]-[n-butyl acrylate (BA) polymer block (b2)]-[methyl methacrylate (MMA) polymer block (b1)] and having a weight-average molecular weight (Mw) of 65,000 and a polymer block mass ratio (b1):(b2):(b1) of 15.25:69.5:15.25.

Block copolymer (B-2): a triblock copolymer consisting of [methyl methacrylate (MMA) polymer block (b1)]-[n-butyl acrylate (BA) polymer block (b2)]-[methyl methacrylate (MMA) polymer block (b1)] and having a weight-average molecular weight (Mw) of 67,000 and a polymer block mass ratio (b1):(b2):(b1) of 16.5:50.5:33.0.

(Methacrylic Resin (C))

Methacrylic resin (C-1): a methacrylic copolymer consisting of a methyl methacrylate (MMA) unit (content: 86% by mass) and a methyl acrylate (MA) unit (content: 14% by mass) and having a viscosity-average degree of polymerization of 490.

Methacrylic resin (C-2): a methacrylic copolymer consisting of a methyl methacrylate (MMA) unit (content: 94% by mass) and a methyl acrylate (MA) unit (6% by mass) and having a viscosity-average degree of polymerization of 1550.

Example 1

90 parts by mass of the multilayer structure polymer particle (A-1), 20 parts by mass of the block copolymer (B-1), and 10 parts by mass of the methacrylic resin (C-1) were melt-kneaded in a twin-screw extruder at a cylinder temperature of 210° C. Then, the melted resin composition was extruded to obtain pellets of an acrylic thermoplastic resin composition (R1), which were then dried at 70° C. for 24 hours. The thermoplastic resin composition (R1) was extruded from a T-die of 150 mm in width set to 220° C. using a 20 mmϕ single-screw extruder (manufactured by OCS GmbH) with an extrusion temperature set to 140 to 210° C. This extrudate was taken over by a cooling roll set to 45° C. to obtain a film of 120 mm in width and 0.5 mm in thickness. Results of evaluating the composition and physical properties of the thermoplastic resin composition (R1) are shown in Table 2.

Examples 2 to 6

Acrylic thermoplastic resin compositions (R2) to (R6) were obtained in the same way as in Example 1 except that the composition was changed as shown in Table 2. In each Example, molding was performed in accordance with Example 1, and a film was obtained using the obtained resin composition. Results of evaluating physical properties in each Example are shown in Table 2.

Comparative Examples 1 to 10

Thermoplastic resin compositions (R11) to (R20) were obtained in the same way as in Example 1 except that the composition was changed as shown in Table 3. In each Comparative Example, a film was obtained using the obtained resin composition in the same way as in Example 1. Results of evaluating physical properties in each Comparative Example are shown in Table 3.

Discussion

The films obtained in Examples 1 to 6 using the acrylic thermoplastic resin composition according to the present disclosure comprising the specific multilayer structure polymer particle (A) and the specific block copolymer (B) had high total light transmittance, small haze, and favorable transparency. Also, these films had a small storage modulus, large tensile elongation at break, and favorable flexibility. In addition, the films had small compression set and favorable rubber elasticity. Furthermore, the films had a large maximum winding speed and favorable film formability.

By contrast, the films obtained in Comparative Examples 1 and 2 using the thermoplastic resin composition consisting of the multilayer structure polymer particle (A) alone, or the multilayer structure polymer particle (A) and the methacrylic resin (C) without comprising the block copolymer (B) had a small maximum winding speed and poor film formability.

The films obtained in Comparative Examples 3 to 8 using the thermoplastic resin composition containing the multilayer structure polymer particle (Y) ((Y-1) or (Y-2)) for comparison having a number-average molecular weight (Mn) exceeding 30,000 in the outermost layer had small tensile elongation at break and poor flexibility. Particularly, the films obtained in Comparative Examples 3 to 5, 7 and 8 had a large storage modulus, small tensile elongation at break, and significantly poor flexibility. The film obtained in Comparative Example 6 using the thermoplastic resin composition containing the multilayer structure polymer particle (Y) ((Y-1)) for comparison wherein the mass ratio of the multilayer structure polymer particle (Y) ((Y-1)) for comparison to the block copolymer (B) ((Y)/(B)) is 2.0 had large compression set and poor rubber elastic behavior, though its storage modulus was improved as compared with Comparative Examples 3 to 5, 7 and 8. The film of Comparative Example 6 also had poor transparency.

The film obtained in Comparative Example 8 using the thermoplastic resin composition consisting only of the block copolymer (B-1) was too soft. Thus, film formation was not achieved. Therefore, the maximum winding speed was immeasurable, and the film formability was poor. Also, this film had large compression set and poor rubber elastic behavior. The film obtained in Comparative Example 9 using the thermoplastic resin composition consisting only of the block copolymer (B-2) had a large storage modulus, small tensile elongation at break, and significantly poor flexibility. Also, this film had large compression set and poor rubber elastic behavior.

TABLE 1

| | | Production Example 1 Multilayer structure polymer particle (A-1) | Production Example 2 Multilayer structure polymer particle (Y-1) | Production Example 3 Multilayer structure polymer particle (Y-2) |
|---|---|---|---|---|
| Layer composition | First layer (rubber component layer (Ia)) [mass ratio] | BA/St/ALMA (82.5/17.5/0.6) | BA/MMA/ALMA (50.0/50.0/0.02) | BA/MMA/TAC (85.0/15.0/0.1) |
| | Second layer (rubber component layer (Ib)) [mass ratio] | BA/St/MMA/ALMA (79.0/16.0/5.0/0.8) | BA/MMA/ALMA (95.0/5.0/3.0) | MMA/BA (50.0/50.0) |
| | Third layer (thermoplastic resin component layer (II)) [mass ratio] | MMA/MA (95.0/5.0) | MMA/BA (87.5/12.5) | MMA/MA (80.0/20.0) |
| | Layer ratio layer (Ia)/layer (Ib)/layer (II) [mass ratio] | 50/20/30 | 5/30/65 | 30/20/50 |
| | Number-average molecular weight Mn of outermost layer | 25000 | 33000 | 57000 |
| | Average particle size [nm] | 100 | 100 | 200 |

TABLE 2

| | Example 1 | Example 2 | Example 3 | Example 4 | Example 5 | Example 6 |
|---|---|---|---|---|---|---|
| Thermoplastic resin composition | R1 | R2 | R3 | R4 | R5 | R6 |
| Multilayer structure polymer particle (A-1) [part by mass] | 90 | 90 | 90 | 90 | 100 | 100 |
| Multilayer structure polymer particle (Y-1) [part by mass] | | | | | | |
| Multilayer structure polymer particle (Y-2) [part by mass] | | | | | | |
| Block copolymer (B-1) [part by mass] | 20 | 30 | 10 | 15 | | 50 |
| Block copolymer (B-2) [part by mass] | | | 10 | 15 | 20 | |
| Methacrylic resin (C-1) [part by mass] | 10 | 10 | 10 | 10 | | |
| Methacrylic resin (C-2) [part by mass] | | | | | | |
| (A)/(B) mass ratio [—] | 4.5 | 3.0 | 4.5 | 3.0 | 5.0 | 2.0 |
| Total light transmittance [%] | 91.7 | 91.8 | 91.7 | 91.9 | 91.8 | 91.5 |
| Haze [%] | 3.3 | 2.3 | 3.4 | 1.7 | 1.6 | 4.4 |

TABLE 2-continued

|  | Example 1 | Example 2 | Example 3 | Example 4 | Example 5 | Example 6 |
|---|---|---|---|---|---|---|
| Storage modulus [MPa] (@30° C., 1 Hz) | 26.5 | 5.3 | 99.4 | 47.5 | 153 | 0.4 |
| Tensile elongation at break [%] | 200 | 260 | 220 | 240 | 270 | 280 |
| Compression set [%] (70° C., 24 hrs, 25% compression) | 54 | 71 | 68 | 79 | 83 | 73 |
| Maximum winding speed [m/min] | 8.7 | 9.1 | 10 | 10 | 9.1 | 10 |

TABLE 3

|  | Comparative Example 1 | Comparative Example 2 | Comparative Example 3 | Comparative Example 4 | Comparative Example 5 |
|---|---|---|---|---|---|
| Thermoplastic resin composition | R11 | R12 | R13 | R14 | R15 |
| Multilayer structure polymer particle (A-1) [part by mass] | 100 | 90 |  |  |  |
| Multileyer structure polymer particle (Y-1) [part by mass] |  |  | 100 | 100 | 100 |
| Multilayer structure polymer particle (Y-2) [part by mass] |  |  |  |  |  |
| Block copolymer (B-1) [pan by mass] |  |  |  | 20 | 15 |
| Block copolymer (B-2) [part by mass] |  |  |  |  | 15 |
| Methacrylic resin (C-1) [part by mass] |  | 10 |  |  |  |
| Methacrylic resin (C-2) [part by mass] |  |  | 30 |  |  |
| (A)/(B) mass ratio [—] | Infinite | Infinite | Infinite | 5.0 | 3.3 |
| Total light transmittance [%] | 91.3 | 91.2 | 91.5 | 90.1 | 91.5 |
| Haze [%] | 9.1 | 6.6 | 1.1 | 7.0 | 1.9 |
| Storage modulus [MPa] (@30° C., 1 Hz) | 30.8 | 122 | 1510 | 783 | 602 |
| Tensile elongation at break [%] | 220 | 150 | 6 | 78 | 100 |
| Compression set [%] (70° C., 24 hrs, 25% compression) | 68 | 75 | Immeasurable (100 or more) | 71 | 81 |
| Maximum winding speed [m/min] | 1.2 | 1.5 | 10 | 10 | 10 |

|  | Comparative Example 6 | Comparative Example 7 | Comparative Example 8 | Comparative Example 9 | Comparative Example 10 |
|---|---|---|---|---|---|
| Thermoplastic resin composition | R16 | R17 | R18 | R19 | R20 |
| Multilayer structure polymer particle (A-1) [part by mass] |  |  |  |  |  |
| Multileyer structure polymer particle (Y-1) [part by mass] | 100 | 100 |  |  |  |
| Multilayer structure polymer particle (Y-2) [part by mass] |  |  | 100 |  |  |
| Block copolymer (B-1) [pan by mass] | 50 |  | 30 | 100 |  |
| Block copolymer (B-2) [part by mass] |  |  |  |  | 100 |
| Methacrylic resin (C-1) [part by mass] |  |  |  |  |  |
| Methacrylic resin (C-2) [part by mass] |  |  |  |  |  |
| (A)/(B) mass ratio [—] | 2.0 | Infinite | 5.0 | 0.0 | 0.0 |
| Total light transmittance [%] | 89.7 | 92.2 | 91.6 | 92.0 | 92.0 |
| Haze [%] | 18.1 | 1.1 | 4.0 | 2.0 | 2.0 |
| Storage modulus [MPa] (@30° C., 1 Hz) | 128 | 1190 | 650 | 3.5 | 850 |
| Tensile elongation at break [%] | 90 | 27 | 83 | 380 | 120 |
| Compression set [%] (70° C., 24 hrs, 25% compression) | 91 | 20 | Immeasurable (100 or more) | 96 | Immeasurable (100 or more) |
| Maximum winding speed [m/min] | 10 | 10 | 10 | x | 10 |

The present disclosure is not limited by the embodiments and Examples described above. The design may be appropriately changed or modified without departing from the spirit of the present disclosure.

This application claims the priority based on Japanese Patent Application No. 2016-088910 filed on Apr. 27, 2016, the disclosure of which is incorporated herein in its entirety.

The invention claimed is:

1. An acrylic thermoplastic resin composition comprising a two-layer or more multilayer structure polymer particle (A) and a block copolymer (B), wherein:
   the multilayer structure polymer particle (A) is an acrylic multilayer structure polymer particle which has, as an inner layer, at least one rubber component layer (I) consisting of a copolymer consisting of 50 to 99.99% by mass of an acrylic acid ester monomer unit, 49.99 to 0% by mass of an additional monofunctional monomer unit, and 0.01 to 10% by mass of a polyfunctional monomer unit, and has, as an outermost layer, at least one thermoplastic resin component layer (II) consisting of 40 to 100% by mass of a methacrylic acid ester monomer unit and 60 to 0% by mass of an additional monomer unit and having a number-average molecular weight of 30,000 or smaller measured by GPC, wherein
   a mass ratio of the total amount of the rubber component layer (I) to the total amount of the thermoplastic resin component layer (II) is 30/70 to 90/10,
   wherein the multilayer structure polymer particle (A) has an average particle size of 150 nm or smaller;
   the block copolymer (B) is an acrylic block copolymer having a weight-average molecular weight of 32,000 to 300,000 measured by GPC; and
   a mass ratio of the multilayer structure polymer particle (A) to the block copolymer (B) is 55/45 to 99/1,
   wherein the block copolymer (B) comprises 10 to 80% by mass of a polymer block (b1) having 80% by mass or more of a methacrylic acid ester monomer unit, and 90 to 20% by mass of a polymer block (b2) having 45% by mass or more of an acrylic acid ester monomer unit; and the total amount of the polymer block (b1) and the polymer block (b2) is defined as 100% by mass, or wherein the block copolymer (B) is a triblock copolymer.

2. The acrylic thermoplastic resin composition according to claim 1, wherein:

the multilayer structure polymer particle (A) is a multilayer structure polymer particle having a three-layer structure consisting of a rubber component layer (Ia) which is a first rubber component layer (I), a rubber component layer (Ib) which is a second rubber component layer (I), and the thermoplastic resin component layer (II) in the presented order from the center, wherein a mass ratio of the rubber component layer (Ia) to the rubber component layer (Ib) is 5/95 to 95/5: and a value determined by subtracting a percent content by mass of the acrylic acid ester monomer unit in the rubber component layer (Ib) from a percent content by mass of the acrylic acid ester monomer unit in the rubber component layer (Ia) is 3% by mass or more.

3. The acrylic thermoplastic resin composition according to claim 1, wherein the rubber component layer (I) comprises a styrene monomer unit as the additional monofunctional monomer unit.

4. The acrylic thermoplastic resin composition according to claim 1, wherein the block copolymer (B) comprises 10 to 80% by mass of a polymer block (b1) having 80% by mass or more of a methacrylic acid ester monomer unit, and 90 to 20% by mass of a polymer block (b2) having 45% by mass or more of an acrylic acid ester monomer unit; and the total amount of the polymer block (b1) and the polymer block (b2) is defined as 100% by mass.

5. The acrylic thermoplastic resin composition according to claim 1, wherein the block copolymer (B) is a triblock copolymer.

6. The acrylic thermoplastic resin composition according to claim 1, wherein the acrylic thermoplastic resin composition further comprises a methacrylic resin (C), wherein a content of the methacrylic resin (C) is 1 to 20 parts by mass with respect to 100 parts by mass in total of the multilayer structure polymer particle (A) and the methacrylic resin (C).

7. A molded article, consisting of the acrylic thermoplastic resin composition according to claim 1.

8. A film, consisting of the acrylic thermoplastic resin composition according to claim 1.

9. A method for producing the film according to claim 8, the method comprising forming the film by a T-die method.

10. A laminate having an acrylic thermoplastic resin layer consisting of the acrylic thermoplastic resin composition according to claim 1, and an additional resin layer.

11. The laminate according to claim 10, wherein the additional resin layer comprises at least one thermoplastic resin selected from the group consisting of methacrylic resin, polyvinyl chloride, ABS resin, and polycarbonate.

* * * * *